United States Patent [19]
Kolb

[11] Patent Number: 4,651,128
[45] Date of Patent: Mar. 17, 1987

[54] METHOD OF MONITORING THE INCLINATION OF A MOTOR VEHICLE

[76] Inventor: Hans Kolb, An der Aussicht 29, D-5270 Gummersbach-Hülsenbusch, Fed. Rep. of Germany

[21] Appl. No.: 699,976

[22] PCT Filed: May 11, 9184

[86] PCT No.: PCT/DE84/00106
§ 371 Date: Jan. 16, 1985
§ 102(e) Date: Jan. 16, 1985

[87] PCT Pub. No.: WO84/04502
PCT Pub. Date: Nov. 22, 1984

[30] Foreign Application Priority Data
May 17, 1983 [DE] Fed. Rep. of Germany ....... 3318275

[51] Int. Cl.$^4$ ............................................. B60R 25/00
[52] U.S. Cl. ...................................... 340/63; 340/65; 340/683; 340/689; 340/566; 200/52 A; 200/61.45 R; 200/61.52
[58] Field of Search .................... 340/63-65, 340/683, 511, 689, 686, 566, 562; 200/52 A, 61.45 R, 61.47, 61.48, 61.52, 153 A, DIG. 1

[56] References Cited

U.S. PATENT DOCUMENTS

| | | | |
|---|---|---|---|
| 3,742,478 | 6/1973 | Johnson | 340/539 |
| 4,359,717 | 11/1982 | Huber et al. | 340/566 |
| 4,414,541 | 11/1983 | Ho | 340/65 |
| 4,514,720 | 4/1985 | Oberstein et al. | 340/511 |
| 4,547,771 | 10/1985 | Rockwood et al. | 340/683 |

*Primary Examiner*—Donnie L. Crosland
*Attorney, Agent, or Firm*—David A. Jackson

[57] ABSTRACT

An apparatus and method for monitoring the inclination of a motor vehicle, measures the inclination during successive time periods with an inclination-sensitive sensor to produce measured signals; converts the measured signals to digital form; averages the digital signals during an initial predetermined time period to form an original reference signal; stores the original reference signal; compares subsequent digital signals to the reference signal to form a deviation signal which is used for triggering an alarm when a plurality of the digital signals deviate from the reference signal by more than a predetermined tolerance value; the reference signal being continuously updated by averaging subsequent digitized measured signals at plurality of times during subsequent time periods to form updated reference signals; storing each updated reference signal in place of a previously stored reference signal; providing an oscillation window to prevent triggering of the alarm during natural oscillation of the vehicle.

10 Claims, 2 Drawing Figures

METHOD OF MONITORING THE INCLINATION OF A MOTOR VEHICLE

BACKGROUND OF THE INVENTION

The invention relates to a method of monitoring the inclination of a motor vehicle comprising measuring the inclination thereof with an inclination-sensitive sensor, generating variable digital signals by the sensor, evaluating the signals, and triggering an alarm when the signals differ from a reference value.

Methods of protecting motor vehicles which operate on the basis of monitoring the inclination thereof are known. Such methods are intended on the one hand to protect the vehicle itself from being stolen by being loaded on to another vehicle, being pulled up over a ramp, and also on the other hand to prevent the vehicle being lifted by a jack for the purposes of removing and stealing a wheel. In all such operations, the body of the vehicle moves relative to the chassis structure, or the spring components move with respect to other components. Such movements may be shocks, jerky movements or also a lifting movement using a vehicle jack. In all cases, the bodywork of the vehicle changes in inclination with respect to a starting condition. A change in inclination can therefore be used for triggering off an alarm.

However, directly connecting an acoustic and/or optical alarm signal source to a sensor or detector for detecting the inclination of the vehicle would result in a large number of false alarms. It may happen that the vehicle is nudged or bumped against only for a short period of time due to vibration, children playing or the like. The inclination of the vehicle undergoes change. The vehicle returns to a stable position after a period of time of the order of magnitude of perhaps only half a second. It may also happen for example that the vehicle changes its angle of inclination over a longer period of time, under the influence of weather or outside temperature. A coating of snow on the roof of the vehicle may melt off on one side. When the vehicle is parked on a soft piece of ground, it may sink at one side. Likewise, it may happen that the vehicle is caused to oscillate at its natural frequency due to vibration or an impact. They are maintained for a small number of periods and then die away. The vehicle will also oscillate at its natural frequency and, in so doing, change in inclination, when for example children intentionally bounce or rock the vehicle on its suspension. An alarm is not to be triggered off in all such cases. Such an alarm would be a false alarm and would result in the user switching off the alarm installation after a few false alarms had occurred.

OBJECTS AND SUMMARY OF THE INVENTION

The invention is based on the problem of so providing a method of the general kind set forth in the opening part of this specification, that alterations in inclination which do not endanger the security of the vehicle are recognized as such and an alarm is not triggered off in response thereto. One difficulty with all alarm methods lies in correctly setting the degree of sensitivity thereof. Excessively high sensitivity results in false alarms being set off, whereas if the level of sensitivity is too low, alarms which are necessary suppressed. The term sensitivity in this context is used to denote that deviation from a fixed or reference value at which an alarm is triggered off. That value is not constant in relation to a motor vehicle. At various locations at which it is stopped or parked, it may occupy a position at a different inclination. As indicated in the opening part of this specification, the inclination of the vehicle may also alter, when the vehicle is parked. Therefore, presetting a constant reference value, for example corresponding to a horizontal parking surface, would not do justice to the situations which actually arise. Depending on the degree of sensitivity which is to be set, that would result in false alarms or would result in alarms which are necessary not being given.

Starting from that basic consideration, the problem of the present invention is so to provide an alarm method of the general kind set forth in the opening part of this specification that false alarms are eliminated, in spite of providing the maximum possible level of sensitivity. According to the present invention, the solution to the foregoing problem, in a method of the general kind set forth, provides that the signals are averaged over a predetermined period of time to form a reference value, and the reference value is stored, the signals which then come in, during a predetermined period of time, are compared to the reference value and, in the event of deviation by more than a predetermined value, the alarm is triggered off. Therefore, the method according to the invention does not operate with a constant reference value. Whenever the vehicle has been parked and the method has been started off afresh, a reference value is freshly set, corresponding to the inclination of the vehicle at that time. A tolerance window is notionally formed around the reference value. If the signals which come in after the operation of forming the reference value lie within the tolerance window, no alarm is triggered. If the signals are outside the tolerance window, the alarm is triggered off.

The method according to the invention operates digitally and with logic elements. The digital signals produced by the sensor are a measurement in respect of the vehicle inclination. In that connection, in a desirable embodiment, it is recommended that the variable digital signals have a different time spacing depending on the vehicle inclination. In that connection, to form the reference value, it is recommended that the signals which are used for forming same are counted a plurality of times during constant periods of time which follow in succession at intervals from each other, the number of counted signals is averaged, and the average value is stored as the reference value.

As discussed above, it may happen that the vehicle changes its inclination over a period of for example half an hour or more slowly. That is due to influences which do not endanger the security of the vehicle. Therefore, an alarm which is triggered off in that case, with a reference value that remains constant, would be a false alarm. To eliminate such false alarms, the invention provides that each incoming signal is measured and stored, each stored parameter is compared to that which was previously stored, while establishing the direction of a deviation, and the signs of the deviations established are totalled separately in accordance with positive and negative values, the totalled positive and negative values are compared together, the difference is formed, and a fresh reference value is formed and stored only when said difference exceeds a minimum value.

The slow movement of the vehicle out of an initial inclined position can be referred to as drift. As soon as the drift has reached a certain amount, the reference value must be re-formed. That amount corresponds to the predetermined amount referred to above. It determines the size of what is referred to as the drift window which is formed around the reference value. Nothing happens as long as the incoming signals lie within the drift window. As soon as they are outside the drift window and are repeated a given number of times during a predetermined period of time, the reference value is re-formed.

The foregoing definiation of the drift window may also be described in the following terms: the number of measurements in which the present measurement value lay above the previous value is totalled to form the sum $S_1$. Likewise, the number of those measurements which gave a measurement value which was below the respectively preceding measurement value is totalled to form the sum $S_0$. In principle, a fresh reference value is to be formed only when the present measurement value deviates from the stored reference value by the above-indicated amount and when at the same time the amount of the difference between the two sums $S_0$ and $S_1$, that is to say, $S_0-S_1$, exceeds a predeterminable number, the minimum value.

All possible interference effects which could result in an undesired deviation of the measurement value from the stored reference value and which could thus possibly cause false alarms to be set off, are distinguished by such drift in respect of the measurement value. That means that the respective measurement values are successively subject to an increasing deviation from the reference value. If that situation occurs, the values which are being continuously measured will differ from the previously measured values predominantly in a single direction. That results in a rapid increase in the difference $S_0-S_1$, which then causes a fresh reference value to be formed, once the fixed minimum value has been exceeded.

It has already been indicated above that the vehicle may be causes to oscillate due to vibration, for example as a result of heavy vehicles travelling past, or intentionally by children. Such oscillations result in changes in the inclination of the vehicle and would thus set off an alarm. Such an alarm would be a false alarm. Because of its comparatively large mass, oscillations which are started off for the above-indicated reasons will take place at the natural frequency of the vehicle. That is known. Therefore, the oscillations which occur at the natural frequency can be easily recognized. Accordingly, alarms which are triggered off thereby may be suppressed. More specifically, it is provided for that purpose that, upon the occurrence of a signal which in its deviation from the reference value exceeds a predetermined positive minimum value, a check is made to ascertain whether a signal which occurs after a predetermined period of time exceeds an equal negative minimum value and at least one signal lies between those two signals, that, when said signal sequence is detected, the checking operation is repeated for a predetermined period of time, and, when the signal sequence occurs, the triggering of an alarm is suppressed. The predetermined period of time corresponds at least to half the period of the natural frequency. According to the invention therefore the method involves establishing whether signals which are spaced apart in time in accordance with the natural frequency are subject to periodic variations in the measurement value, and whether therefore the vehicle is in a condition of oscillation. In that case, no alarm is triggered off. The operation of checking the signal sequence is repeated until the vehicle should have resumed a rest condition again, by virtue of the known damping action of its suspension. Reference may be made in this respect to an oscillation window. The oscillation window is so selected that its limits lie within the tolerance window which is the crucial factor in regard to setting off the alarm. Thus, measurement values which are within the oscillation window do not result in an alarm being triggered off, in a static situation.

DETAILED DESCRIPTION OF A PREFERRED EMBODIMENT

Figure 1:
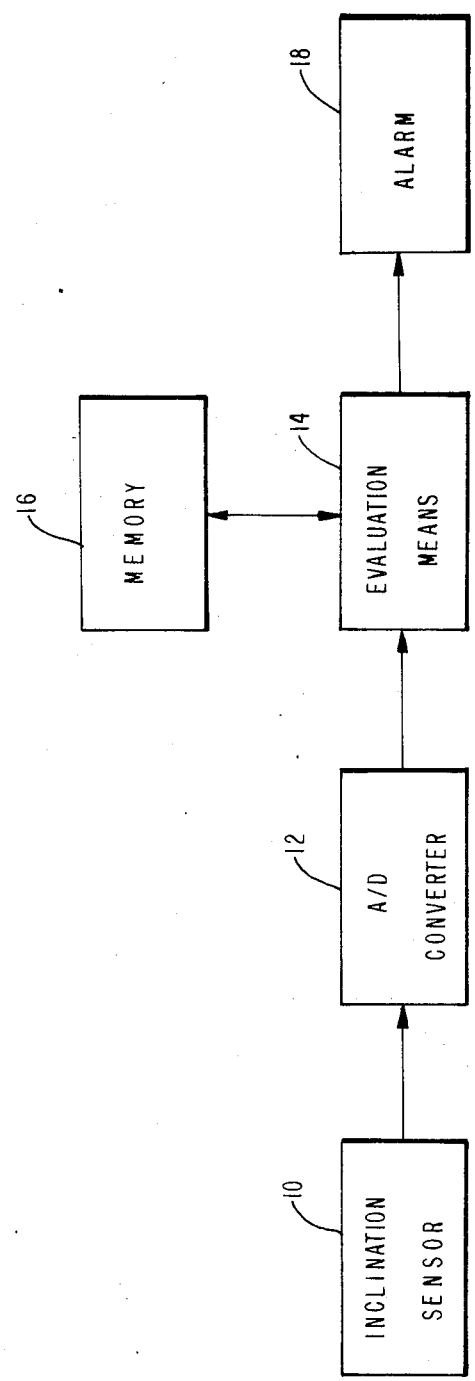
FIG. 1 is a block diagram of inclination monitoring apparatus according the the present invention.

The invention will be further described by means of an embodiment which is set out hereinafter, with reference to FIG. 1.

THE SENSOR

The sensor or detector 10 used is a plate capacitor, the capacitance of which depends on its position. The plates of the capacitor are arranged in a closed housing that is partly filled with an electrically non-conducting fluid which has a high dielectric constant. In the event of the capacitor being inclined in one direction or the other, the fluid runs up between the plates or runs away between them. That causes a change in the capacitance between the plates of the capacitor. That change in capacitance is measured, and is a measurement in respect of inclination. In practice, two such capacitors will be used, with the longitudinal axes thereof being at right angles to each other. If the capacitor or capacitors is or are fixedly connected to a vehicle, the inclination thereof may be electrically measured, in two planes. The capacitance of the capacitor or capacitors is then substantially proportional to the position or inclination of the vehicle.

The capacitor serves as a frequency defining member of an RC oscilltor, the active portion of which is formed with inverting CMOS gates. Because of the extremely high-resistance inputs and the extremely low input currents, resulting therefrom, in such gates, it is possible for the ohmic resistance, the magnitude of which also determines the oscillator frequency, to be so high that high oscillation frequencies are produced, with a generally very low current flow.

GENERAL MODE OF OPERATION

In accordance with the method, the inclination of a stopped vehicle is constantly measured and checked. If alterations in the inclination of the vehicle occur, of such a degree as to be beyond a predetermined tolerance window, an electrical signal is produced, with which an alarm means 18 in the vehicle can be set off.

FORMING THE REFERENCE VALUE AND TOLERANCE WINDOW

When the vehicle is parked, the method is set in operation and for that purpose also the oscillator is started. The frequency which is then measured (inclination) is stored in a memory 16 as a reference value after being transformed into a digital signal by an analog-to-digital (A/D) converter 12 and after being supplied to evaluation means 14. All following measured frequency values are compared to that reference value. If they are within a predetermined tolerance window around the reference value, a fresh measurement is taken at given intervals of time. Only when a plurality of successively measured values, the number of which can be fixed, lie outside the tolerance window in an upward direction or in a downward direction, is that considered to be a deviation, and an alarm is set off.

FORMING THE DRIFT WINDOW

As a result of changes in temperature, irregular formation or melting of a coating of snow on the roof of the car or for other reasons, the inclination of the vehicle may alter slowly. A drift window is formed in order to suppress false alarms resulting therefrom.

Each measurement value is compared to the preceding value, irrespective of the set tolerance window. Evaluation means 14 establishes whether it was larger or smaller than that value. That governs storage of each measurement value, not the reference value, at least for a period of time, at the end of which the next following measurement value is available, and the comparison operation could be carried out. If the new measurement is above the old measurement value, the counter condition of an 'upward drift counter' is increased by one while that of a 'downward drift counter' is reduced by one. If the new measurement value is below the old value, the counter condition of the 'downward drift counter' is increased by one while that of the 'upward drift counter' is reduced by one. The evaluation means 14 ensures that the counter conditions cannot fall below zero and cannot go beyond a maximum level which however may be very high.

In that way, within the above-mentioned tolerance window, the drift window which can also be predetermined in respect of its width is formed.

If now the measured value in respect of inclination lies for example above the drift window in at least a predeterminable number of successive measurement operations, the evaluation means 14 checks the counter condition of the 'upward drift counter'. If that condition exceeds a predeterminable value, that means that, in the previous period of time, the situation had very frequently occurred that measurement values lay above the preceding value and thus the measurement value was subject to a slow upward drift. The last measurement value is then taken over as the new reference value and the tolerance and drift windows are now related to the new measurement value. The predetermined minimum value in respect of the condition of the drift counter, when carrying out the comparison operation, must be selected at such a value that that counter condition cannot be attained in the event of a slow change in position of the vehicle, from the outside, and an alarm is reliably triggered off.

A similar consideration applies in the situation where a measured value in respect of inclination lies below the drift window, over a predeterminable number of successive measurement operations.

FORMING THE OSCILLATION WINDOW

Simple methods result in false alarms when the vehicle is bounced or rocked from the outside and thus the inclination thereof periodically increases to a value which is attained when the vehicle is towed away without authorization or the like. As already stated, such oscillations always occur at the natural frequency of the vehicle body. It is not possible to impress a given frequency of oscillation thereon, from the exterior. Therefore, possible oscillations always occur with a substantially constant period.

Within the tolerance window is a third window, referred to as the oscillation window, which may also coincide with the second window being the drift window. If now a measurement value is above the oscillation window, the evaluation means 14 establishes whether, within a time $t_1$ which is of fixed duration, in general at least one measurement value is within the oscillation window and thereafter in respect of time, at least one is below the window. If that is the case, a fixed number N of following measurement values is monitored only in respect of their alternating characteristic with respect to the oscillation window, in the respective periods of time $t_1$. If, at a time at which the number N has not yet been attained, the alternating characteristic is again detected by the evaluation means 14, in a period of time $t_1$, corresponding to the above-mentioned detected measurement value, a number of N measurement values which are exclusively monitored in respect of their alternating characteristic is again preset. Even if measurement values outside the tolerance window occur in that period of time, that does not result in the alarm being set off. All three conditions must be fulfilled within the period of time which is of a duration $t_1$.

If no more alternating measurement values occur, that means that the rocking or bouncing movements of the vehicle have ceased. The evaluation means 14 now compares the present measurement value to the reference value before the rocking or bouncing movement was recognised. If that measurement value falls outside the tolerance window for a fixed number of successive measurement operations, the alarm is set off. If that is not the case, a new mean or average value is formed, and is put into store as the reference value.

In that connection, the period of time $t_1$ must be greater than half the period of the natural oscillation of the body relative to the chassis structure.

After each occasion on which an alarm has been set off, the reference value is re-set. That provides that, after a vehicle has been lifted and, as a result, the alarm has been set off, the alarm is set off again when the vehicle is let down.

Figure 2:
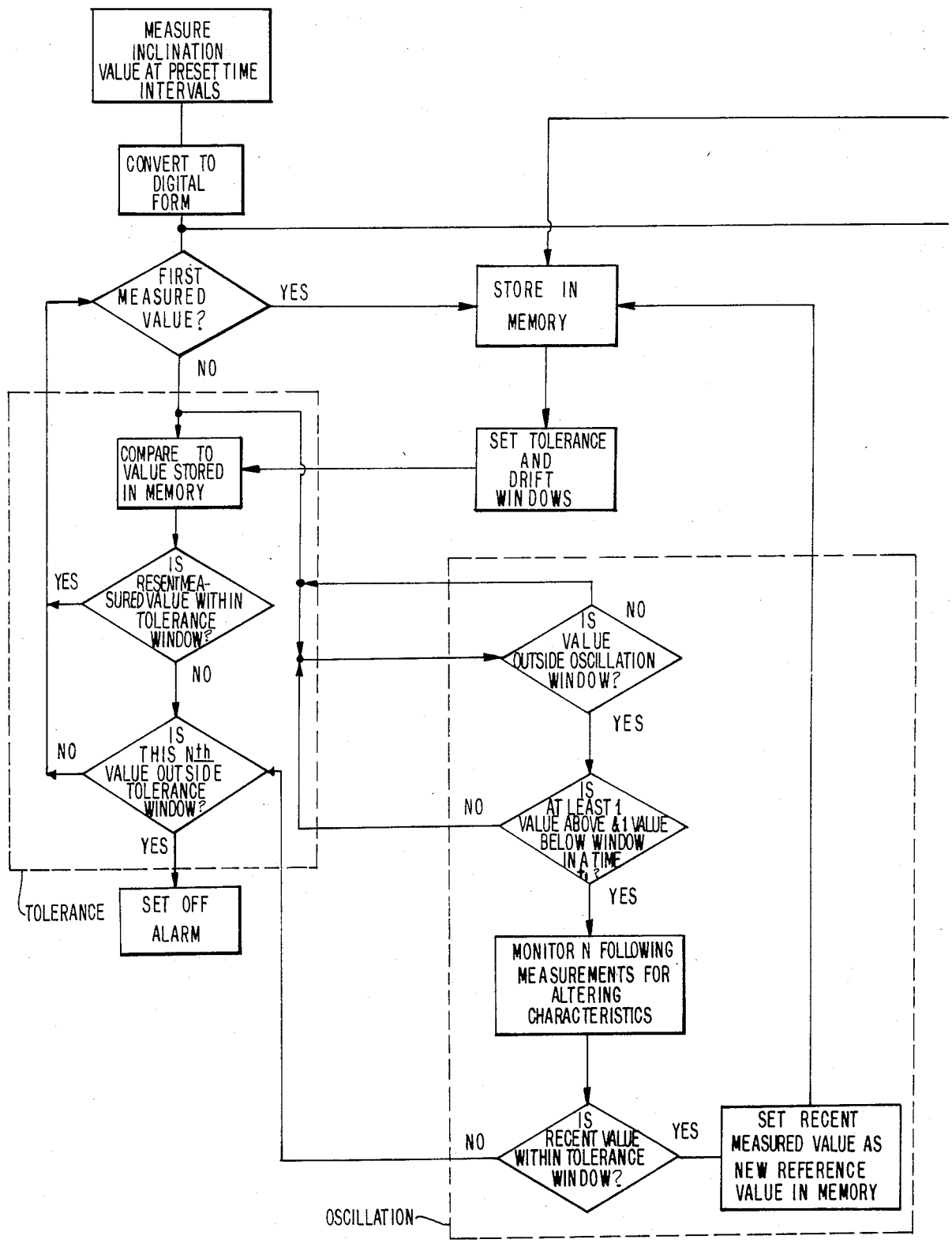
FIG. 2 is a flow chart used for illustrating the operation of the apparatus of FIG. 1.
Figure 2:
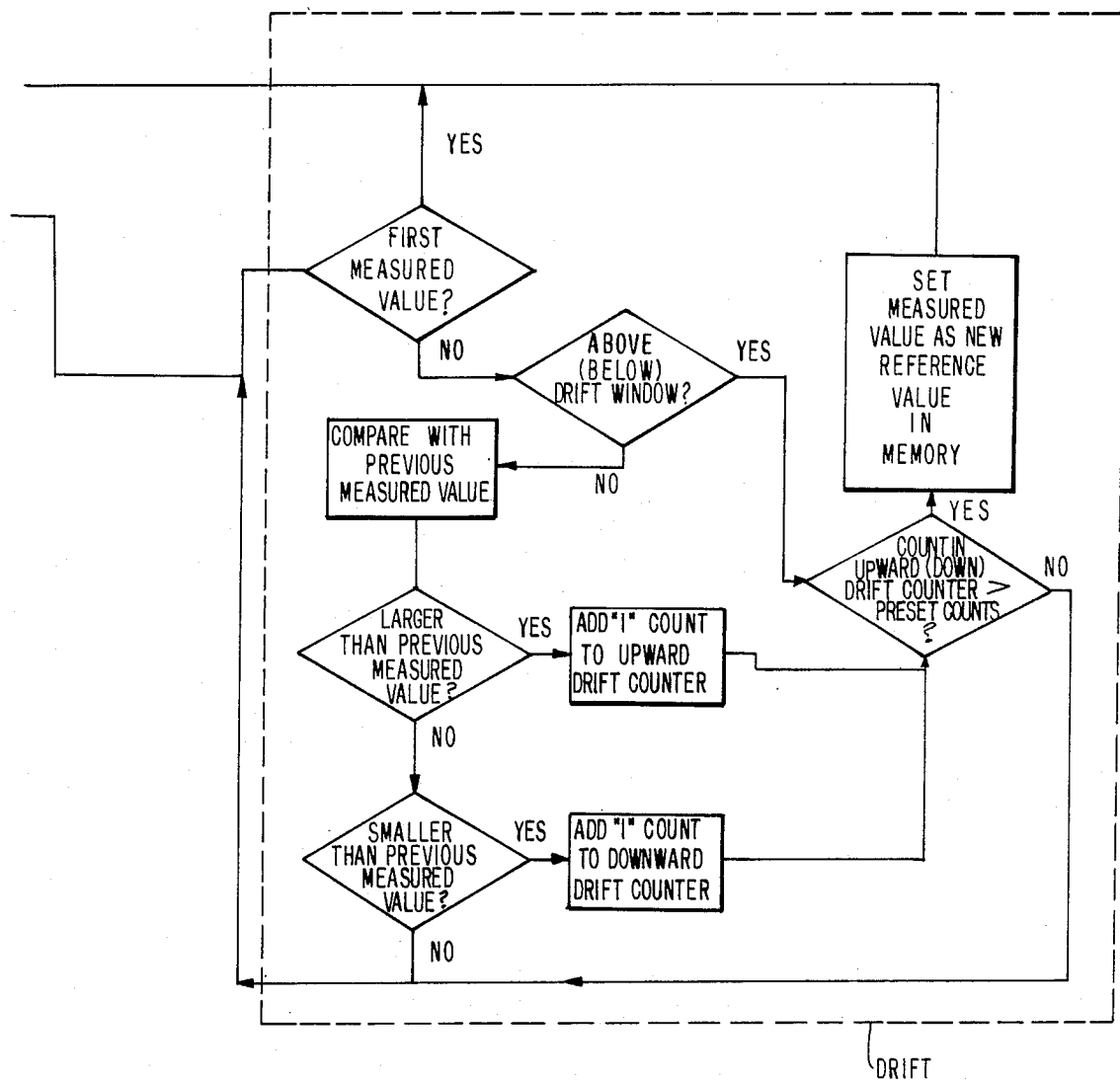

A flow chart which summarizes the above is produced in FIG. 2.

I claim:

1. A method of monitoring the inclination of a motor vehicle, comprising the steps of:
    measuring said inclination during successive time periods with an inclination-sensitive sensor to produce measured signals;
    converting said measured signals to digital form to produce digitized measured signals:
    averaging said digitized measured signals during a predetermined time period to form an original reference signal;
    storing said original reference signal;
    comparing subsequent digitized measured signals to said reference signal to form a deviation signal;
    triggering an alarm when at least one subsequent digitized measured signal deviates from said reference signal by more than a predetermined tolerance valve;
    characterized by the steps of:

averaging said subsequent digitized measured signals a plurality of times during subsequent time periods to form updated reference signals; and storing each updated reference signal in place of a previously stored reference signal.

2. A method according to claim 1, further comprising the steps of:
   comparing each measured signal to the previous measured signal;
   detecting the direction of deviation of each measured signal to said previously stored measured signal;
   counting the number of detected deviations having positive values;
   counting the number of detected deviations having negative values;
   comparing the totalled number of positive value deviations with the total number of negative value deviations to form a difference; and
   storing a new reference value only when said difference exceeds a minimum value.

3. A method according to claim 1; further comprising the step of reforming said reference value after each triggering of said alarm.

4. A method according to claim 1; further comprising the step of pulse width modulating said measured digitized signals.

5. A method according to claim 1; further comprising the step of monitoring said digitized measured signals for oscillation characteristics;
   determining whether said digitized measured signals fall outside of a predetermined oscillation window; and
   inhibiting triggering of said alarm when said digitized measured signals fall outside of said oscillation window and exhibit said oscillation characteristics.

6. Apparatus for monitoring the inclination of a motor vehicle, comprising:
   means for measuring said inclination during successive time periods with an inclination-sensitive sensor to produce measured signals;
   means for converting said measured signals to digital form to produce digitized measured signals:
   means for averaging said digitized measured signals during a predetermined time period to form an original reference signal;
   means for storing said original reference signal;
   means for comparing subsequent digitized measured signals to said reference signal to form a deviation signal;
   means for triggering an alarm when at least one subsequent digitized measured signal deviates from said reference signal by more than a predetermined tolerance valve;
characterized by:
   means for averaging said subsequent digitized measured signals a plurality of times during subsequent time periods to form updated reference signals; and
   means for storing each updated reference signal in place of a previously stored reference signal.

7. Apparatus according to claim 6; further comprising:
   means for comparing each measured signal to the previous measured signal;
   means for detecting the direction of deviation of each measured signal to said previously stored measured signal;
   means for counting the number of detected deviations having positive values;
   means for counting the number of detected deviations having negative values;
   means for comparing the totalled number of positive value deviations with the total number of negative value deviations to form a difference; and
   means for storing a new reference value only when said difference exceeds a minimum value.

8. Apparatus according to claim 6; further comprising means for reforming said reference value after each triggering of said alarm.

9. Apparatus according to claim 6; further comprising pulse width modulating means for modulating said measured digitized signals.

10. Apparatus according to claim 6; further comprising means for monitoring said digitized measured signals for oscillation characteristics;
   means for determining whether said digitized measured signals fall outside of a predetermined oscillation window; and
   means for inhibiting triggering of said alarm when said digitized measured signals fall outside of said oscillation window and exhibit said oscillation characteristics.

* * * * *